US012654453B2

(12) United States Patent
Nishikawa et al.

(10) Patent No.: US 12,654,453 B2
(45) Date of Patent: Jun. 16, 2026

(54) INKJET PRINTER

(71) Applicant: RISO KAGAKU CORPORATION, Tokyo (JP)

(72) Inventors: Ryosuke Nishikawa, Tokyo (JP); Takeshi Higuchi, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 216 days.

(21) Appl. No.: 18/240,011

(22) Filed: Aug. 30, 2023

(65) Prior Publication Data

US 2024/0100840 A1 Mar. 28, 2024

(30) Foreign Application Priority Data

Sep. 27, 2022 (JP) ................................. 2022-153357
Aug. 28, 2023 (JP) ................................. 2023-138291

(51) Int. Cl.
*B41J 2/17* (2006.01)
*B41J 2/175* (2006.01)
*B41J 11/00* (2006.01)

(52) U.S. Cl.
CPC ......... *B41J 2/1714* (2013.01); *B41J 2/17503* (2013.01); *B41J 11/007* (2013.01); *B41P 2235/27* (2013.01)

(58) Field of Classification Search
CPC .... B41J 2/1714; B41J 2/17503; B41J 11/007; B41J 2/175; B41J 29/38; B41J 11/00; B41J 2/185; B41J 2/1742; B41P 2235/27
See application file for complete search history.

(56) References Cited

U.S. PATENT DOCUMENTS

2011/0109693 A1* 5/2011 Ohnishi ..................... B41J 2/18 347/34
2017/0151790 A1* 6/2017 Mataki ................. B41J 2/16585
2020/0269585 A1 8/2020 Izawa et al.

FOREIGN PATENT DOCUMENTS

JP 2020-138329 A 9/2020
JP 2021020436 A * 2/2021

* cited by examiner

*Primary Examiner* — Jannelle M Lebron
(74) *Attorney, Agent, or Firm* — Greenblum & Bernstein, P.L.C.

(57) ABSTRACT

An inkjet printer includes: an inkjet head configured to eject ink to a print medium being conveyed; a mist collector including at least a suction port configured to suck air from a side of the inkjet head on which the print medium passes; and a controller configured to control the mist collector. A space on the side of the inkjet head on which the print medium passes is an open space in which nothing but the print medium passing is arranged within a prescribed distance from the inkjet head. The controller is configured to control the mist collector to perform a mist collection operation of sucking air containing ink mist via the suction port in a state where the print medium and the inkjet head are facing each other.

12 Claims, 11 Drawing Sheets

INKJET PRINTER

CROSS-REFERENCE TO RELATED APPLICATIONS

The present application is based on and claims the benefit of priority from the prior Japanese Patent Application No. 2022-153357, filed on Sep. 27, 2022 and the prior Japanese Patent Application No. 2023-138291, filed on Aug. 28, 2023, the entire contents of which are incorporated by reference herein.

TECHNICAL FIELD

The disclosure relates to an inkjet printer.

BACKGROUND

In an inkjet printer, ejection of an ink generates an ink mist that is fine mist-form ink droplets. The ink mist attaches to a nozzle surface of an inkjet head to cause an ink ejection failure, or attaches to a printed sheet or an interior of an apparatus to smear these objects in some cases.

To counter this, Japanese Patent Application Publication No. 2020-138329 discloses an inkjet printer configured to collect the ink mist. This inkjet printer includes a blow port arranged upstream of each of inkjet heads in a conveyance direction of a print medium conveyed by a conveyor belt and a collection port arranged downstream of the inkjet head. Air is blown out from the blow port toward the print medium side, and the collection port sucks the ink mist together with air from the print medium side.

In this inkjet printer, a space between a nozzle surface and the conveyor belt is used as a flow passage of air containing the ink mist, between the blow port and the collection port in the conveyance direction. The ink mist can be thereby efficiently collected.

SUMMARY OF THE INVENTION

Inkjet printers include an inkjet printer as follows. In the inkjet printer, an inkjet head is arranged such that a nozzle surface is a vertical surface to enable ejection of an ink in a horizontal direction. This inkjet printer can perform printing on a surface, of a print medium being a three-dimensional object such as a cardboard box, orthogonal to the horizontal direction.

In this type of inkjet printer, the conveyance mechanism configured to convey the print medium is not arranged to face the nozzle surface of the inkjet head. Accordingly, the nozzle surface side of the inkjet head (side on which the print medium passes) is an open space in which nothing is arranged near the nozzle surface.

Accordingly, in this type of inkjet printer, it is impossible to form a flow passage for collection of the ink mist between the nozzle surface and the conveyance mechanism (conveyor belt) and efficiently collect the ink mist as in the inkjet printer of Japanese Patent Application Publication No. 2020-138329.

The disclosure is directed to an inkjet printer that can efficiently collect an ink mist and in which the side of an inkjet head on which a print medium passes is an open space.

An inkjet printer in accordance with some embodiments includes: an inkjet head configured to eject ink to a print medium being conveyed; a mist collector including at least a suction port configured to suck air from a side of the inkjet head on which the print medium passes; and a controller configured to control the mist collector. A space on the side of the inkjet head on which the print medium passes is an open space in which nothing but the print medium passing is arranged within a prescribed distance from the inkjet head. The controller is configured to control the mist collector to perform a mist collection operation of sucking air containing ink mist via the suction port in a state where the print medium and the inkjet head are facing each other.

According to the aforementioned configuration, an ink mist can be efficiently collected in an inkjet printer in which the side of an inkjet head on which a print medium passes is an open space.

DETAILED DESCRIPTION OF THE INVENTION

Figure 1:
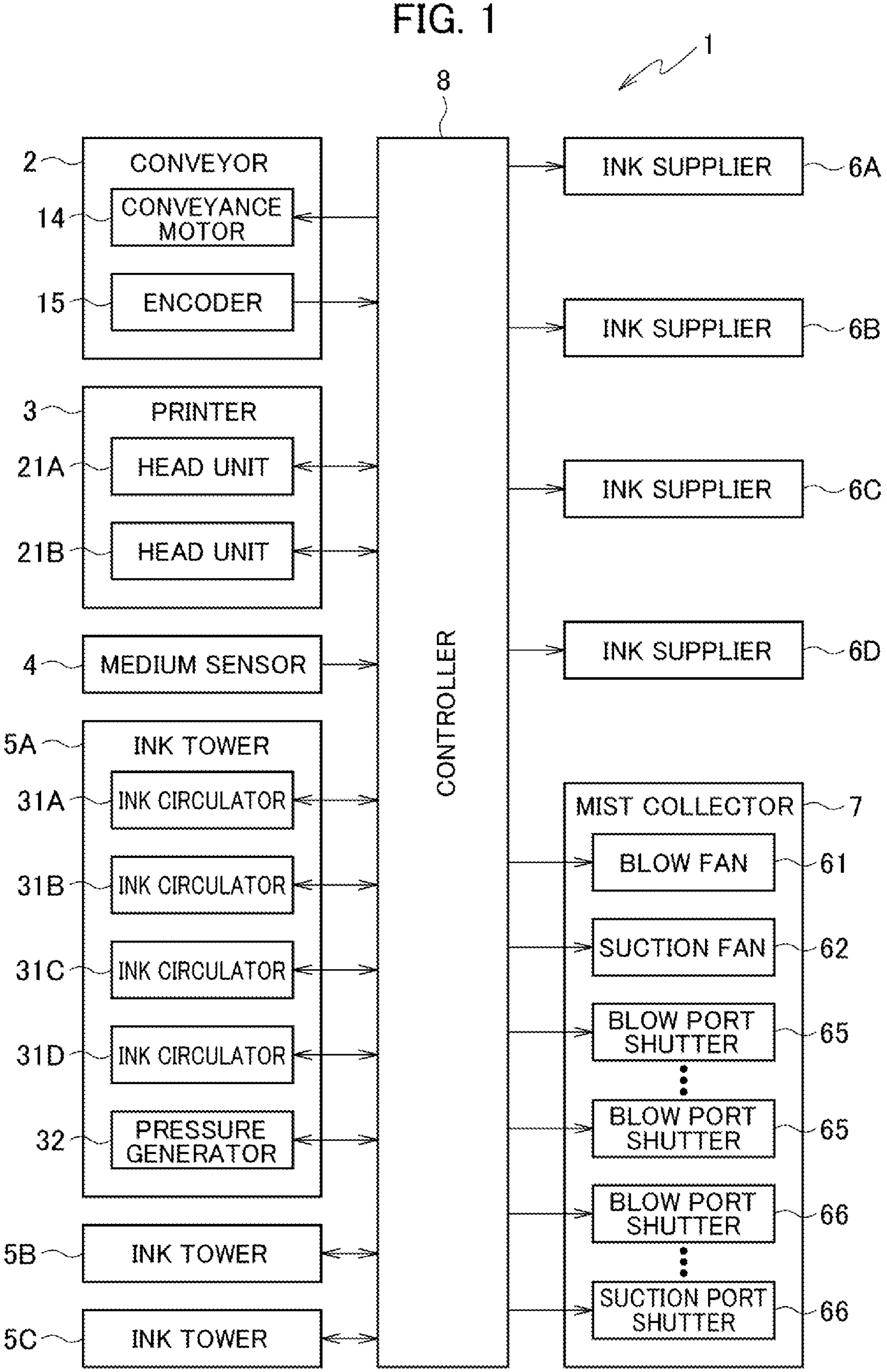
FIG. 1 is a block diagram illustrating a configuration of an inkjet printer according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

Figure 2:
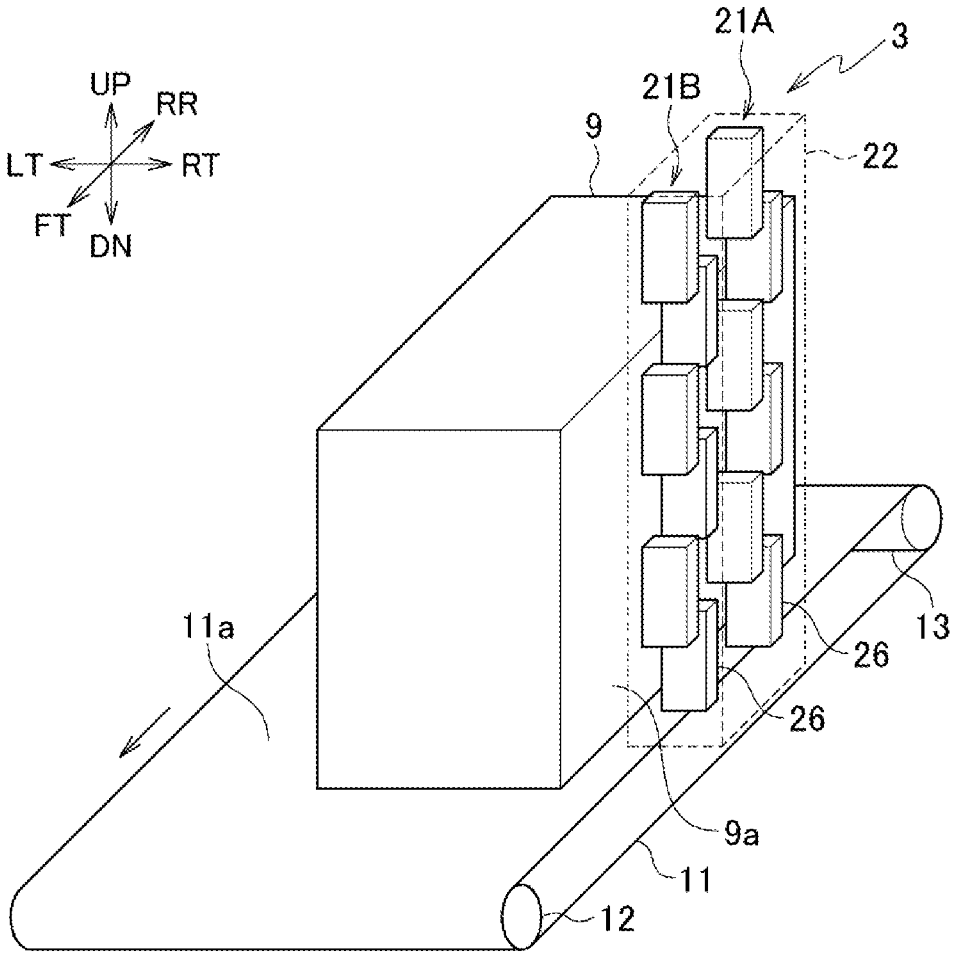
FIG. 2 is a perspective diagram illustrating a schematic configuration of a main portion of the inkjet printer illustrated in FIG. 1.
Figure 3:
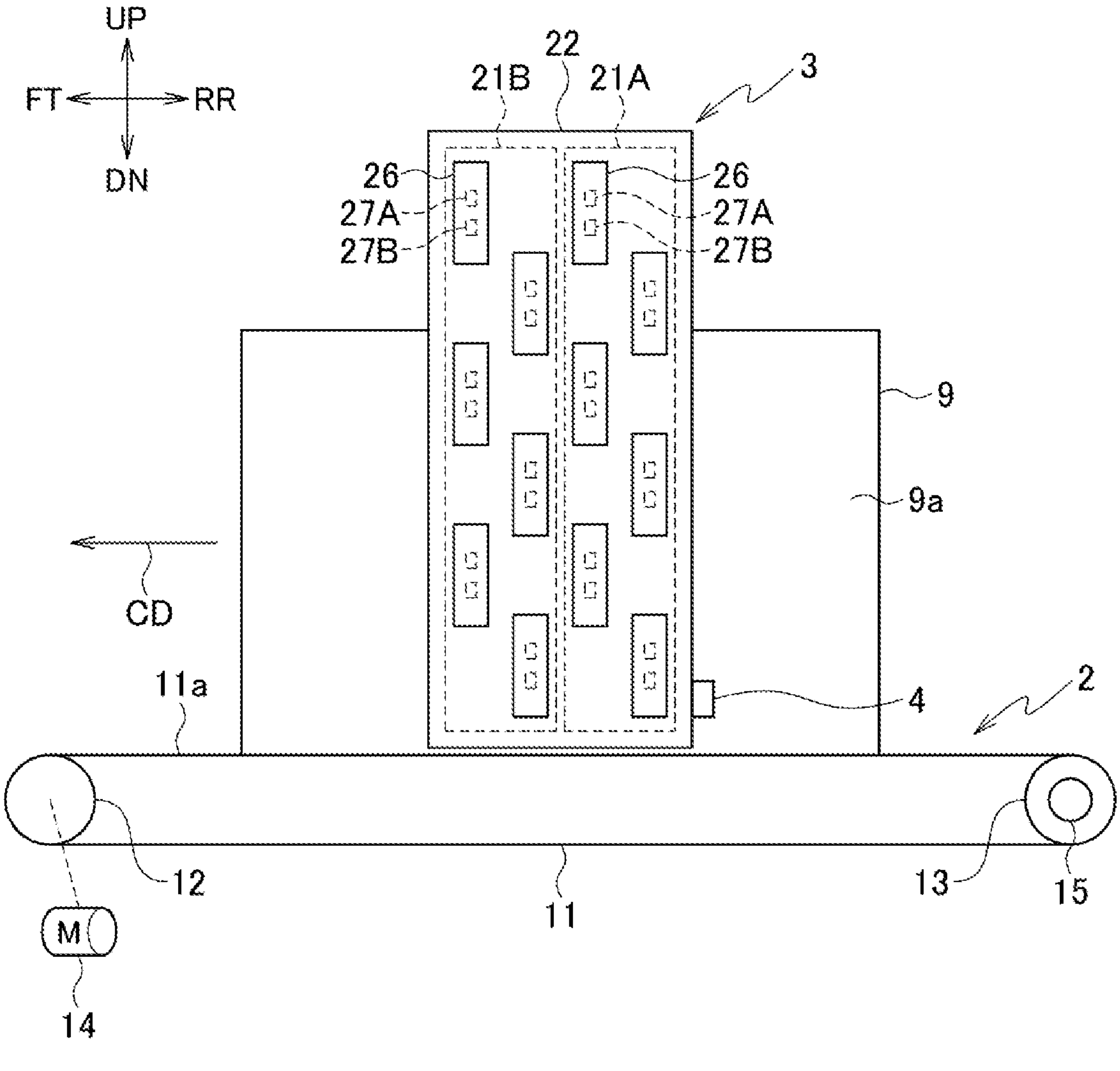
FIG. 3 is a front diagram illustrating the schematic configuration of the main portion of the inkjet printer illustrated in FIG. 1.
Figure 4:
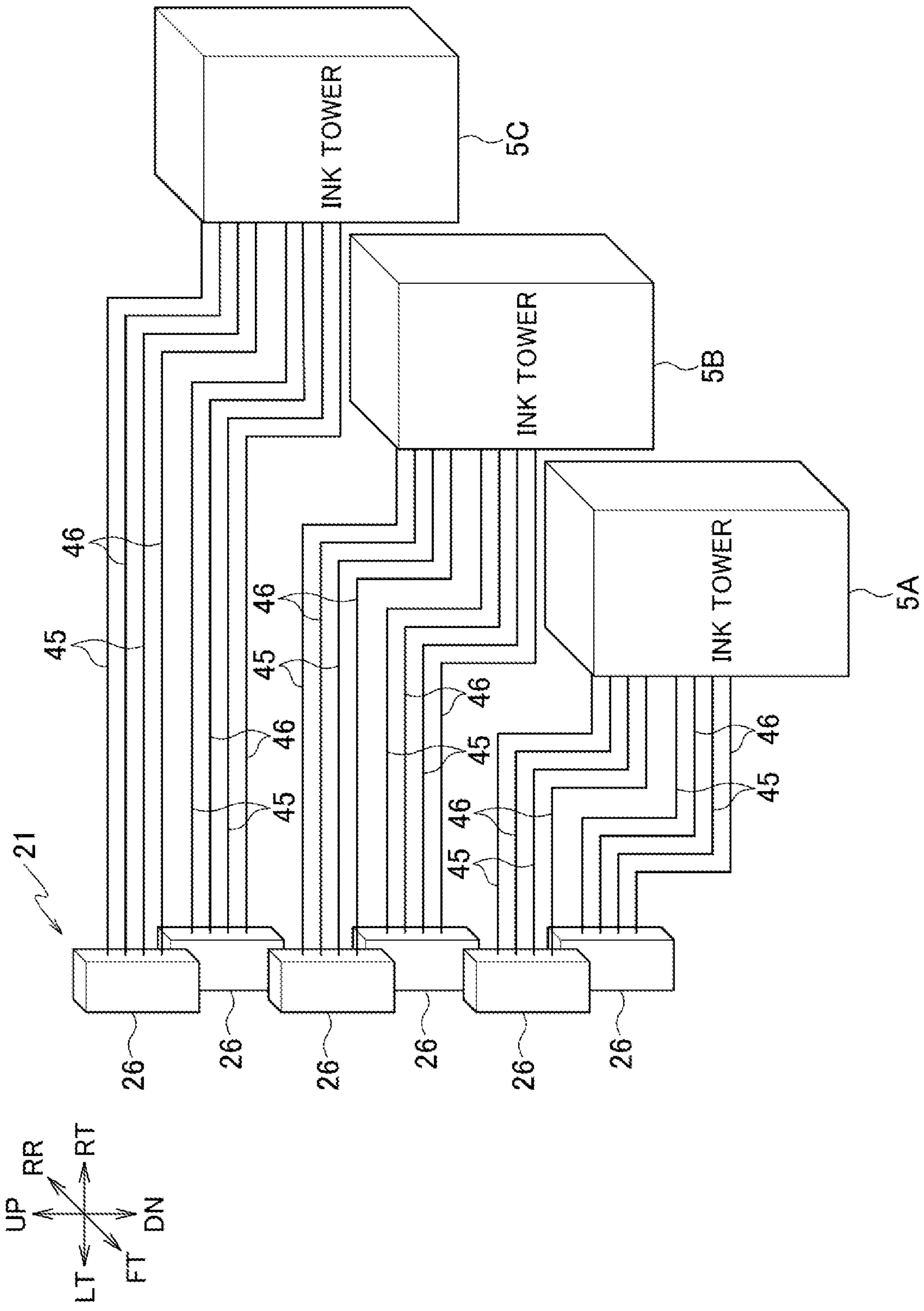
FIG. 4 is a schematic configuration diagram of a head unit and ink towers in the inkjet printer illustrated in FIG. 1.
Figure 5:
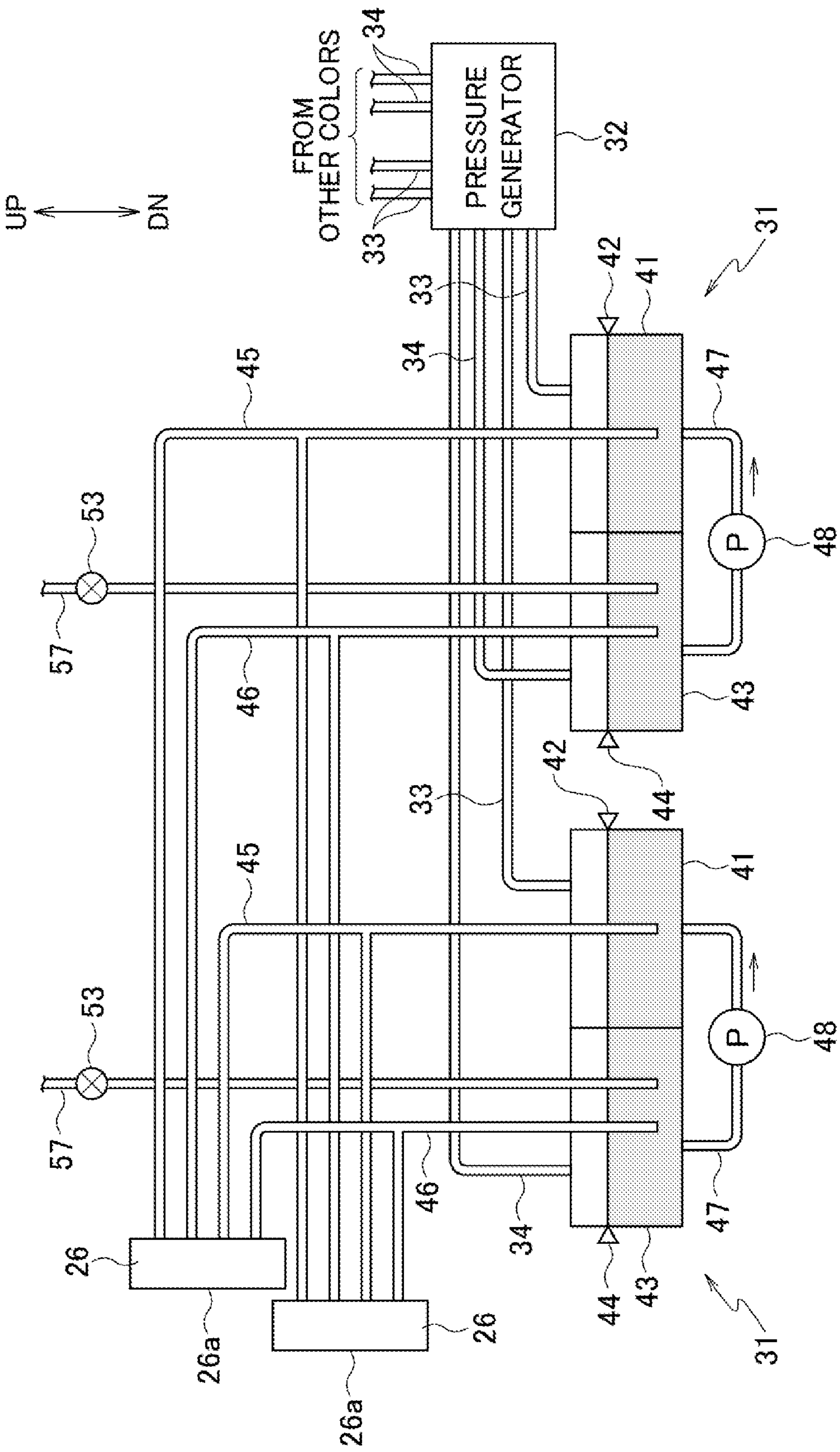
FIG. 5 is a schematic configuration diagram of each of the ink towers in the inkjet printer illustrated in FIG. 1.
Figure 6:
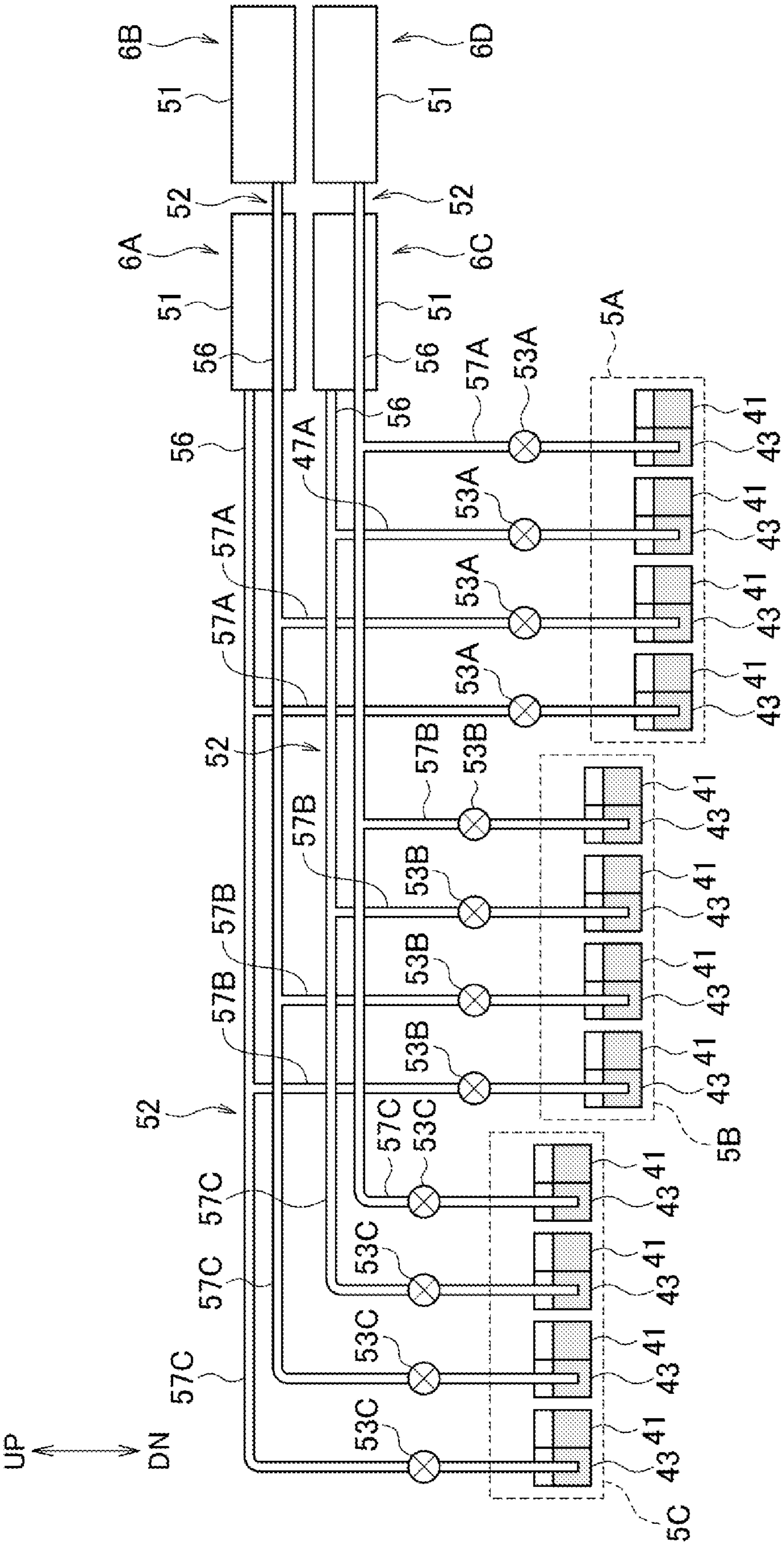
FIG. 6 is a schematic configuration diagram of ink suppliers in the inkjet printer illustrated in FIG. 1.
Figure 7:
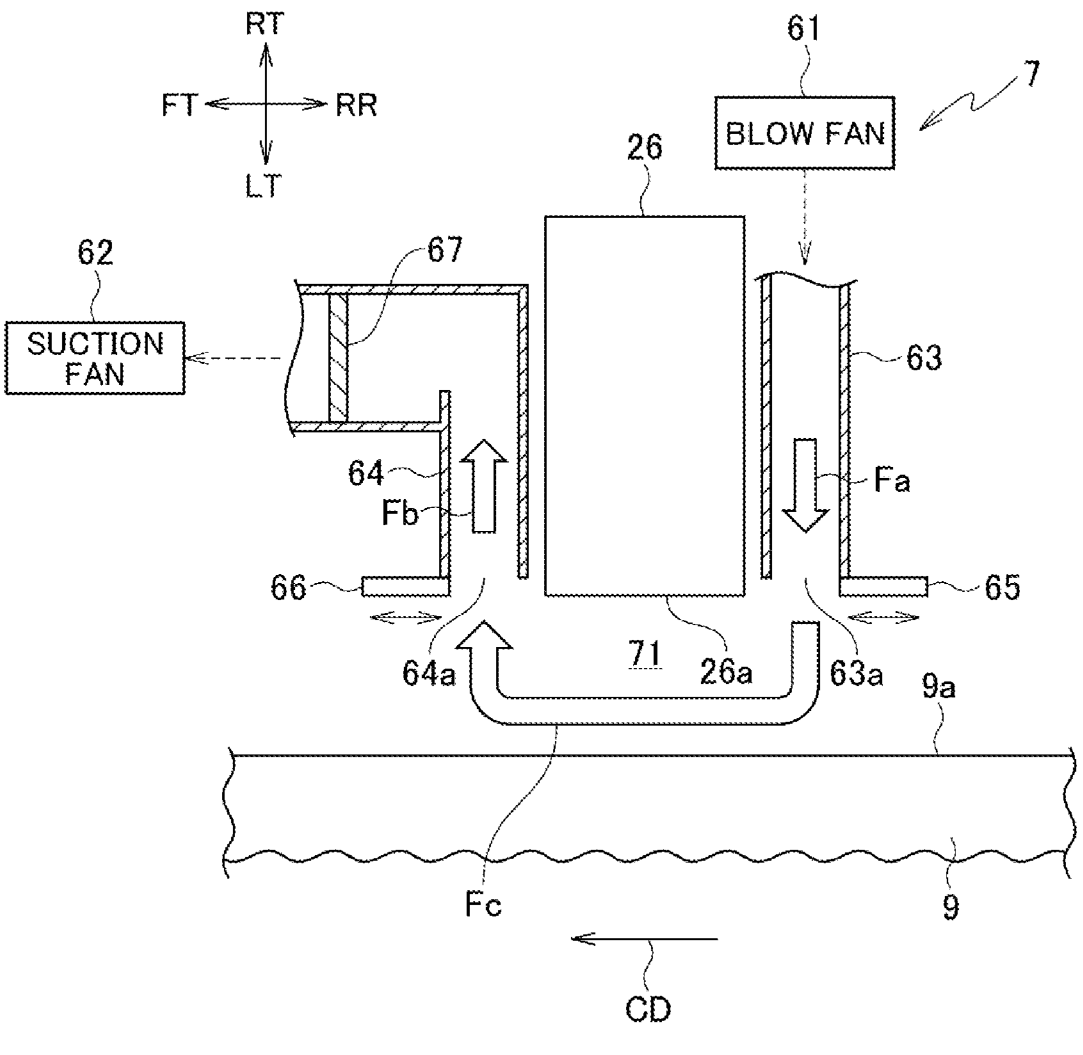
FIG. 7 is a partial enlarged diagram of a mist collector in the inkjet printer illustrated in FIG. 1.
Figure 8:
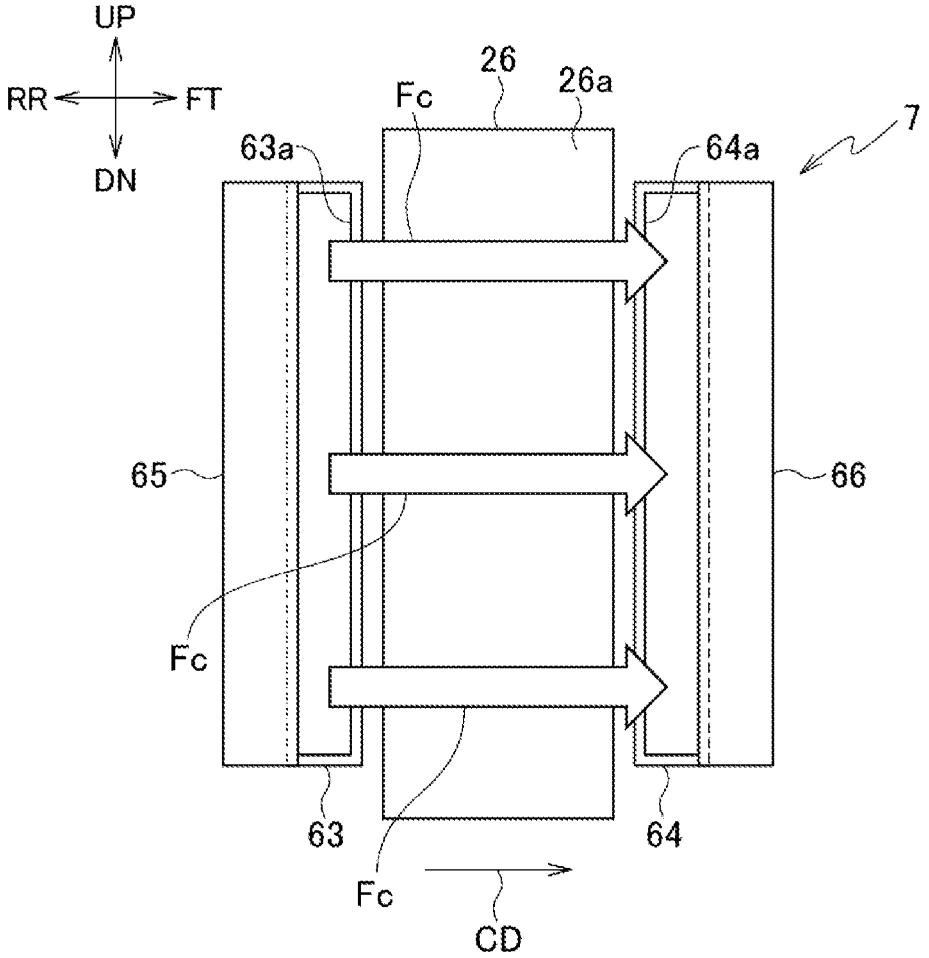
FIG. 8 is a diagram illustrating a main portion of the mist collector as viewed from the nozzle surface side of an inkjet head in the inkjet printer illustrated in FIG. 1.

FIG. 1 is a block diagram illustrating a configuration of an inkjet printer according to a first embodiment of the present invention. FIG. 2 is a perspective diagram illustrating a schematic configuration of a main portion of the inkjet printer illustrated in FIG. 1. FIG. 3 is a front diagram illustrating the schematic configuration of the main portion of the inkjet printer illustrated in FIG. 1. FIG. 4 is a schematic configuration diagram of a head unit and ink towers in the inkjet printer illustrated in FIG. 1. FIG. 5 is a schematic configuration diagram of each of the ink towers in the inkjet printer illustrated in FIG. 1. FIG. 6 is a schematic configuration diagram of ink suppliers in the inkjet printer illustrated in FIG. 1. FIG. 7 is a partial enlarged diagram of a mist collector in the inkjet printer illustrated in FIG. 1. FIG. 8 is a diagram illustrating a main portion of the mist collector as viewed from the nozzle surface side of an inkjet head in the inkjet printer illustrated in FIG. 1.

In the following description, up, down, left, right, front, and rear indicated by the arrows in FIG. 2 are defined as of up, down, left, right, front, and rear directions. An up-down direction is the vertical direction. A left-right direction and a front-rear direction are orthogonal to each other, are both orthogonal to the up-down direction, and are directions in parallel with the horizontal direction. In FIGS. 2 to 8, 10, and 12, the right direction, the left direction, the up direction, the down direction, the front direction, the rear direction, and a conveyance direction are denoted by RT, LT, UP, DN, FT, RR, and CD, respectively.

As illustrated in FIG. 1, the inkjet printer 1 according to the first embodiment includes a conveyor 2, a printer 3, a medium sensor 4, ink towers 5A to 5C, ink suppliers 6A to 6D, a mist collector 7, and a controller 8. Note that, in the following description, attached alphabets in reference signs such as the ink towers 5A to 5C are sometimes omitted for collective notation.

The conveyor 2 conveys a print medium 9. The print medium 9 has a printed surface 9*a* on which printing is performed by the printer 3. The printed surface 9*a* is a surface (vertical surface) that is orthogonal to the horizontal direction in a state where the print medium 9 is conveyed by being placed on the conveyor 2. The print medium 9 is, for example, a cardboard box.

As illustrated in FIGS. 1 to 3, the conveyor 2 includes a conveyor belt 11, a drive roller 12, a driven roller 13, a conveyance motor 14, and an encoder 15.

The conveyor belt 11 is an annular belt wound around the drive roller 12 and the driven roller 13. The conveyor belt 11 conveys the print medium 9 placed on a conveyance surface 11*a* in the conveyance direction from the rear side toward the front side by being driven and circulated in the counterclockwise direction in FIG. 3. The conveyance surface 11*a* is an upper surface of the conveyor belt 11 that is horizontal between the drive roller 12 and the driven roller 13.

The drive roller 12 rotates the conveyor belt 11 in the counterclockwise direction in FIG. 3.

The driven roller 13 supports the conveyor belt 11 together with the drive roller 12. The driven roller 13 is arranged to be separated from the drive roller 12 in the horizontal direction. The driven roller 13 rotates by following the rotating conveyor belt 11.

The conveyance motor 14 rotationally drives the drive roller 12.

The encoder 15 outputs a pulse signal depending on a rotation angle of the driven roller 13.

The printer 3 performs printing on the printed surface 9*a* of the print medium 9. The printer 3 includes head units 21A and 21B and a head holder 22.

The head units 21A and 21B perform printing by ejecting inks to the printed surface 9*a* of the print medium 9. Each of the head units 21A and 21B ejects inks of two colors. For example, the head unit 21A ejects black and cyan inks, and the head unit 21B ejects magenta and yellow inks. The head units 21A and 21B have the same configuration except for the point that the colors of the ejected inks are different.

As illustrated in FIG. 3, each of the head units 21 includes multiple inkjet heads 26. In the present embodiment, each head unit 21 includes six inkjet heads 26. In the head unit 21, the inkjet heads 26 are arranged in zigzag along the up-down direction. Specifically, in the head unit 21, the six inkjet heads 26 aligned along the up-down direction are arranged such that positions thereof in the front-rear direction are alternately shifted.

Each of the inkjet heads 26 ejects inks of two colors. The inkjet head 26 includes two nozzle arrays in each of which multiple nozzles (not illustrated) configured to eject the ink are linearly aligned along the up-down direction at a prescribed pitch. The two nozzle arrays eject inks of different colors, respectively. The inkjet head 26 includes a nozzle surface (corresponding to ejection surface) 26*a* (see FIG. 7 and the like) on which the nozzles of the two nozzle arrays are opened. The nozzle surface 26*a* is a left surface of the inkjet head 26, and is a vertical surface. The inkjet head 26 ejects the inks in the horizontal direction from the nozzles opened on the nozzle surface 26*a*.

Moreover, each inkjet head 26 includes ink temperature sensors 27A and 27B that detect temperature of one of the inks of two colors to be ejected by the inkjet head 26 and temperature of the other ink, respectively.

The inkjet heads 26 are multi-drop type inkjet heads that can eject multiple ink droplets for one pixel from one nozzle, and perform gradation printing in which density is expressed by a drop number that is the number of ink droplets.

In printing, the print medium 9 conveyed by the conveyor 2 passes the left side of the inkjet heads 26. The inkjet heads 26 print an image on the printed surface 9*a* by ejecting the inks in the left direction from the nozzles to the print medium 9.

The conveyance surface 11*a* of the conveyor 2 does not face the nozzle surfaces 26*a* of the multiple inkjet heads 26, and a space on the left side, that is the nozzle surface 26*a* side (side on which the print medium 9 passes) of the inkjet heads 26 is an open space in which nothing but the passing print medium 9 is arranged within a prescribed distance from the inkjet heads 26.

The aforementioned prescribed distance is a distance as follows. Assume a case where a member arranged to face the nozzle surfaces 26*a* is present. The prescribed distance is a minimal distance at which an air flow passage for collecting ink mist can be sufficiently formed between the nozzle surface 26*a* and the aforementioned member by drive of the mist collector 7 to be described later.

Specifically, the space on the left side of the inkjet heads 26 being the open space in which nothing is arranged within the prescribed distance from the inkjet heads 26 means that, in a situation where no print medium 9 is passing, the flow passage of air for collecting the ink mist cannot be sufficiently formed along the nozzle surfaces 26*a* even if the mist collector 7 is driven.

The head holder 22 holds the inkjet heads 26 in the head units 21. Moreover, the head holder 22 holds sets of a blow channel 63 and a suction channel 64 of the mist collector 7 to be described later that are provided to correspond to the respective inkjet heads 26. Note that illustration of the mist collector 7 is omitted in FIGS. 2 to 5.

The medium sensor 4 detects the print medium 9 conveyed by the conveyor 2. The medium sensor 4 is arranged near and upstream of the head unit 21A on the upstream side (rear side) in the conveyance direction of the print medium 9. For example, a reflection type optical sensor can be used as the medium sensor 4.

The ink towers 5A to 5C supply the inks to the head units 21A and 21B. The ink tower 5A supplies the inks to the first and second inkjet heads 26 from the bottom in each of the head units 21A and 21B. The ink tower 5B supplies the inks to the third and fourth inkjet heads 26 from the bottom in each of the head units 21A and 21B. The ink tower 5C supplies the inks to the fifth and sixth inkjet heads 26 from the bottom in each of the head units 21A and 21B.

Note that, in FIG. 4, only one of the head units 21A and 21B is illustrated, and illustration of the other head unit 21 is omitted.

Each of the ink towers 5A to 5C is arranged such that a height difference thereof with each of the inkjet heads 26 to which the ink tower 5 supplies the inks is the same in all of the ink towers 5A to 5C. Accordingly, the ink towers 5A to 5C are arranged at different height positions, respectively. The ink tower 5A among the ink towers 5A to 5C is arranged at the lowest position, and the ink tower 5C is arranged at the highest position.

Each of the ink towers 5 includes ink circulators 31A to 31D, a pressure generator 32, four positive pressure air channels 33 (see FIG. 5), and four negative pressure air channels 34 (see FIG. 5).

The ink circulators 31A to 31D supply the inks to the inkjet heads 26 while circulating the inks. Each of the ink circulators 31A to 31D supplies a color ink different from those of the other ink circulators 31, to the inkjet heads 26 that eject the color ink held by the ink circulator 31.

The ink circulators 31A and 31B are connected to two inkjet heads 26 arranged at different height positions in the head unit 21A, and supply the inks to these two inkjet heads 26. The ink circulators 31C and 31D are connected to two inkjet heads 26 arranged at different height positions in the head unit 21B, and supply the inks to these two inkjet heads 26.

Specifically, the ink circulators 31A and 31B of the ink tower 5A supply the inks to the first and second inkjet heads 26 from the bottom in the head unit 21A. The ink circulators 31C and 31D of the ink tower 5A supply the inks to the first and second inkjet heads 26 from the bottom in the head unit 21B.

Moreover, the ink circulators 31A and 31B of the ink tower 5B supply the inks to the third and fourth inkjet heads 26 from the bottom in the head unit 21A. The ink circulators 31C and 31D of the ink tower 5B supply the inks to the third and fourth inkjet heads 26 from the bottom in the head unit 21B.

Furthermore, the ink circulators 31A and 31B of the ink tower 5C supply the inks to the fifth and sixth inkjet heads 26 from the bottom in the head unit 21A. The ink circulators 31C and 31D of the ink tower 5C supply the inks to the fifth and sixth inkjet heads 26 from the bottom in the head unit 21B.

As illustrated in FIG. 5, each of the ink circulators 31 includes a positive pressure tank (corresponding to ink tank) 41, a positive pressure tank liquid level sensor 42, a negative pressure tank (corresponding to ink tank) 43, a negative pressure tank liquid level sensor 44, a positive pressure side ink channel 45, a negative pressure side ink channel 46, a pump liquid feeding channel 47, and an ink pump 48. Note that FIG. 5 illustrates two of the ink circulators 31A to 31D (ink circulators for two colors) in each ink tower 5 that supply the inks to the same head unit 21.

The positive pressure tank 41 stores the ink to be supplied to the inkjet heads 26. The pressure generator 32 applies positive pressure for feeding of the ink to the inkjet heads 26, to the positive pressure tank 41. The positive pressure tank 41 is arranged at a position below the inkjet head 26 arranged at the lower position among the two inkjet heads 26 connected to the ink circulator 31 including the positive pressure tank 41. The positive pressure tanks 41 of the respective ink circulators 31A to 31D in one ink tower 5 are all arranged at the same height position.

The positive pressure tank liquid level sensor 42 is a sensor for detecting whether the liquid level height of the ink in the positive pressure tank 41 has reached a reference height or not. The positive pressure tank liquid level sensor 42 outputs a signal indicating "on" in the case where the liquid level height in the positive pressure tank 41 is equal to or higher than the reference height, and outputs a signal indicating "off" in the case where the liquid level height is lower than the reference height.

The negative pressure tank 43 receives and stores the ink not consumed in the inkjet heads 26. Moreover, the negative pressure tank 43 stores the ink supplied from the corresponding ink supplier 6. The pressure generator 32 applies negative pressure for collecting the ink from the inkjet heads 26, to the negative pressure tank 43. The negative pressure tank 43 is formed of a tank with the same shape as the positive pressure tank 41, and is arranged at the same height position as the positive pressure tank 41.

The negative pressure tank liquid level sensor 44 is a sensor for detecting whether the liquid level height of the ink in the negative pressure tank 43 has reached a reference height or not. The reference height in the negative pressure tank 43 is the same as the reference height in the positive pressure tank 41. The negative pressure tank liquid level sensor 44 outputs a signal indicating "on" in the case where the liquid level height in the negative pressure tank 43 is equal to or higher than the reference height, and outputs a signal indicating "off" in the case where the liquid level height is lower than the reference height.

The positive pressure side ink channel 45 connects the positive pressure tank 41 and the two inkjet heads 26. The ink to be supplied from the positive pressure tank 41 to the two inkjet heads 26 flow in the positive pressure side ink channel 45.

The negative pressure side ink channel 46 connects the two inkjet heads 26 and the negative pressure tank 43. The ink that is not consumed in the two inkjet heads 26 and that is to be collected into the negative pressure tank 43 flows in the negative pressure side ink channel 46.

The pump liquid feeding channel 47 is a channel through which the ink to be fed from the negative pressure tank 43 to the positive pressure tank 41 by the ink pump 48 flows. An upstream end of the pump liquid feeding channel 47 in a circulation direction of the ink is connected to the negative pressure tank 43, and a downstream end thereof is connected to the positive pressure tank 41.

The ink pump 48 feeds the ink from the negative pressure tank 43 to the positive pressure tank 41. The ink pump 48 is provided in the middle of the pump liquid feeding channel 47.

The pressure generator 32 generates pressure for ink circulation in the positive pressure tank 41 and the negative pressure tank 43 in each ink circulator 31. Specifically, the pressure generator 32 sucks air from the negative pressure tank 43 via a corresponding one of the negative pressure air channels 34, and sends air to the positive pressure tank 41 via a corresponding one of the positive pressure air channels 33 to apply positive pressure to the positive pressure tank 41 and apply negative pressure to the negative pressure tank 43. The pressure generator 32 is a common generator shared by the ink circulators 31A to 31D.

The positive pressure air channel 33 connects the pressure generator 32 and an air layer above the liquid level of the ink in the positive pressure tank 41. One positive pressure air channel 33 is provided to correspond to each of the ink circulators 31A to 31D.

The negative pressure air channel 34 connects the pressure generator 32 and an air layer above the liquid level of the ink in the negative pressure tank 43. One negative pressure air channel 34 is provided to correspond to each of the ink circulators 31A to 31D.

The ink suppliers 6A to 6D supplies the inks to the negative pressure tanks 43 of the ink circulators 31A to 31D, respectively. In the inkjet printer 1, the common ink supplier 6 shared by the ink towers 5A to 5C is provided for each ink color.

Specifically, the ink supplier 6A supplies the ink to the ink circulators 31A in the ink towers 5A to 5C. The ink supplier 6B supplies the ink to the ink circulators 31B in the ink towers 5A to 5C. The ink supplier 6C supplies the ink to the ink circulators 31C in the ink towers 5A to 5C. The ink supplier 6D supplies the ink to the ink circulators 31D in the ink towers 5A to 5C.

As illustrated in FIG. 6, each of the ink suppliers 6 includes an ink cartridge 51, an ink supply channel 52, and ink supply valves 53A to 53C.

The ink cartridge 51 stores the ink to be used in the printing by the inkjet heads 26. The ink cartridge 51 is arranged at a position above the negative pressure tank 43 of the ink tower 5C. The ink in the ink cartridge 51 is supplied to the negative pressure tanks 43 of the ink circulators 31 via the ink supply channel 52.

The ink supply channel 52 connects the ink cartridge 51 and the three negative pressure tanks 43 that are supply destinations of the ink in the ink cartridge 51. The ink flows from the ink cartridge 51 to the negative pressure tanks 43, in the ink supply channel 52. The ink supply channel 52 includes a main channel 56 and branching channels 57A to 57C.

The main channel 56 is a channel that allows the ink to flow from the ink cartridge 51 to the branching channels 57A to 57C. An upstream end of the main channel 56 is connected to the ink cartridge 51, and a downstream end of the main channel 56 is connected to an upstream end of the branching channel 57B and an upstream end of the branching channel 57C.

The branching channels 57A to 57C are channels that branch from the main channel 56 and that are connected to the negative pressure tanks 43 of the ink towers 5A to 5C, respectively. An upstream end of the branching channel 57A is connected to the middle of the main channel 56, and a downstream end of the branching channel 57A is connected to the negative pressure tank 43 of the ink tower 5A. The upstream end of the branching channel 57B is connected to the downstream end of the main channel 56, and a downstream end of the branching channel 57B is connected to the negative pressure tank 43 of the ink tower 5B. The upstream end of the branching channel 57C is connected to the downstream end of the main channel 56, and a downstream end of the branching channel 57C is connected to the negative pressure tank 43 of the ink tower 5C.

The ink supply valves 53A to 53C are arranged in the branching channels 57A to 57C, respectively, and open and close flow passages of the ink in the branching channels 57A to 57C. When the ink is to be supplied to the negative pressure tanks 43, the ink supply valves 53 are opened.

The mist collector 7 collects the ink mist generated by ejection of the inks from the inkjet heads 26.

As illustrated in FIGS. 1, 7, and 8, the mist collector 7 includes a blow fan 61, a suction fan 62, multiple blow channels 63, multiple suction channels 64, multiple blow port shutters 65, multiple suction port shutters 66, and multiple filters 67. The blow channel 63, the suction channel 64, the blow port shutter 65, the suction port shutter 66, and the filter 67 are provided for each of the inkjet heads 26, and each of these elements is provided as many as the inkjet heads 26.

The blow fan 61 blows air to each of the blow channels 63, and causes air to be blown out from each of blow ports 63*a* to be described later. The blow fan 61 is connected to the blow channels 63 via a common blow channel (not illustrated), and can blow air to each of the blow channels 63.

The suction fan 62 sucks air via each of suction ports 64*a* of the respective suction channels 64 to be described later. The suction fan 62 is connected to the suction channels 64 via a common suction channel (not illustrated), and can suck air via each of the suction ports 64*a*.

Each of the blow channels 63 forms a flow passage of air blown out toward the side on which the print medium 9 passes (left side) for ink mist collection. The blow channel 63 is arranged upstream of (behind) the inkjet head 26. A left end of the blow channel 63 is opened toward the side on which the print medium 9 passes (left side), and is formed to be the blow port 63*a* that blows out air.

Each of the suction channels 64 forms a flow passage of air sucked from the side on which the print medium 9 passes (left side) for ink mist collection. The suction channel 64 is arranged downstream of (in front of) the inkjet head 26. A left end of the suction channel 64 is opened toward the side on which the print medium 9 passes (left side), and is formed to be the suction port 64*a* that sucks air.

The blow port shutter 65 opens and closes the blow port 63*a*. The blow port shutter 65 can adjust an opening percentage of the blow port 63*a*.

The suction port shutter 66 opens and closes the suction port 64*a*. The suction port shutter 66 can adjust an opening percentage of the suction port 64*a*.

The filter 67 liquifies and holds the ink mist. The filter 67 is arranged in the suction channel 64. The filter 67 is formed of, for example, sponge.

The controller 8 controls operations of the units in the inkjet printer 1. The controller 8 is formed by including a CPU, a RAM, a ROM, a hard disk drive, and the like.

Specifically, the controller 8 performs control such that the inks are ejected from the inkjet heads 26 to the print medium 9 conveyed by the conveyor 2 to perform printing. Moreover, the controller 8 controls the mist collector 7 to perform a mist collection operation for each of the inkjet heads 26 as follows: in a period in which the inkjet head 26 is ejecting no inks while facing the print medium 9, air is blown out from the blow port 63*a* corresponding to the inkjet head 26, and air containing the ink mist is sucked from the suction port 64*a*.

Next, operations of the inkjet printer 1 are described.

Figure 9:
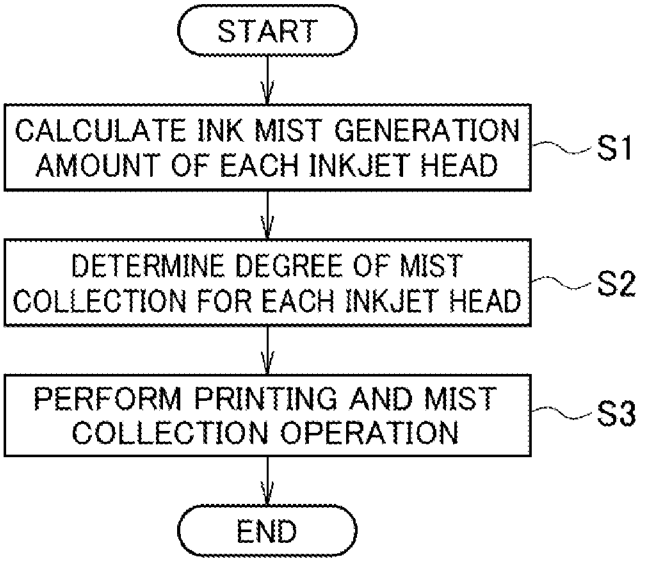
FIG. 9 is a flowchart for explaining operations of the inkjet printer illustrated in FIG. 1.

FIG. 9 is a flowchart for explaining the operations of the inkjet printer 1. Processing of the flowchart of FIG. 9 starts when the inkjet printer 1 receives a print job.

In step S1 of FIG. 9, the controller 8 calculates an ink mist generation amount of each of the inkjet heads 26. The ink mist generation amount is an amount of ink mist estimated to be generated by ejection of the ink in printing.

In this case, the higher the page coverage is, the larger the number of times of ink ejection from the inkjet head 26 is, and thus the greater the degree of ink mist generation is.

Moreover, the larger the water head difference (height difference) between the positive pressure tank 41 and the negative pressure tank 43 connected to the inkjet head 26 is, the higher the nozzle pressure being the negative pressure is (the larger the absolute value of the nozzle pressure is), and thus the greater the degree of ink mist generation in the inkjet head 26 is.

In each head unit 21, a water head difference (height difference) between each of the two inkjet heads 26 connected to the same ink tower 5 and each of the positive pressure tanks 41 and the negative pressure tanks 43 to which these two inkjet heads 26 are commonly connected varies between the two inkjet heads 26 connected to the same ink tower 5. Accordingly, the inkjet head 26 at the higher position out of the two inkjet heads 26 connected to the same ink tower 5 in the head unit 21 has a greater degree of ink mist generation than the inkjet head 26 at the lower position.

For example, the first and second inkjet heads 26 from the bottom in the head unit 21A are both connected to the positive pressure tanks 41 and the negative pressure tanks 43 of the ink circulators 31A and 31B in the ink tower 5A. Accordingly, the second inkjet head 26 from the bottom has a greater degree of ink mist generation than the first inkjet head 26 from the bottom.

Moreover, the lower the temperature of the ink is, the higher the viscosity of the ink is. The higher the viscosity of the ink is, the longer the tail of the ink ejected and flying from the nozzle of the inkjet head 26 is, and the more likely the tail is to break. Accordingly, the lower the ink temperature is, the greater the degree of ink mist generation is.

Accordingly, the controller 8 calculates the ink mist generation amount of each inkjet head 26 based on the page coverage, the water head difference (height difference) between the inkjet head 26 and each of the positive pressure tanks 41 and the negative pressure tanks 43, and the temperature of the inks in each inkjet head 26.

Specifically, the controller 8 develops an image of the print job to generate image data, and generates print data with a format corresponding to printing by the inkjet heads 26 based on the generated image data. Then, the controller 8 calculates the page coverage of the inks of two colors in each inkjet head 26 for each print medium 9, based on the print data.

Moreover, the controller 8 starts the ink circulation in the ink circulators 31A to 31D of the ink towers 5A to 5C. Specifically, the controller 8 causes each of the pressure generators 32 of the ink towers 5A to 5C to generate setting pressure for ink circulation for each of the positive pressure tanks 41 and the negative pressure tanks 43, in the each of the positive pressure tanks 41 and the negative pressure tanks 43. The ink circulation in each of the ink circulators 31A to 31D in the ink towers 5A to 5C is thereby started, and the inks flow from the positive pressure tanks 41 to the negative pressure tanks 43 via the inkjet heads 26.

When the ink circulation is started, the controller 8 controls a temperature adjustor (not illustrated) provided in each of the ink circulators 31A to 31D, and adjusts the temperature of the circulated ink such that the temperature falls into a suitable temperature range. In this case, the temperature of the circulated ink is detected by, for example, an ink temperature sensor (not illustrated) provided in the positive pressure side ink channel 45.

When the temperature of the ink circulated in each ink circulator 31 in each ink tower 5 falls into the suitable temperature range, the controller 8 obtains the temperatures of the inks of two colors in each inkjet head 26 from the ink temperature sensors 27A and 27B in the inkjet head 26.

Then, the controller 8 calculates the ink mist generation amount of each inkjet head 26 for each print medium 9, based on the page coverage of the inks of two colors, the water head difference (height difference) between the inkjet head 26 and each of the positive pressure tank 41 and the negative pressure tank 43, and the temperatures of the inks of two colors in the inkjet head 26.

Then, in step S2, the controller 8 determines a degree of mist collection for each inkjet head 26 in the mist collection operation, based on the ink mist generation amount of the inkjet head 26. Specifically, for each inkjet head 26, the controller 8 determines an opening percentage and an opening time of each of the blow port 63*a* and the suction port 64*a* corresponding to the inkjet head 26, based on the ink mist generation amount of the inkjet head 26.

The controller 8 determines the opening percentage and the opening time of each of the blow port 63*a* and the suction port 64*a* such that the larger the ink mist generation amount is, the greater the degree of mist collection is. The larger the opening percentage is, the greater the degree of mist collection is, if the opening time is the same. Moreover, the longer the opening time is, the greater the degree of mist collection is, if the opening percentage is the same.

In the mist collection operation, air blown out from the blow port 63*a* may cause the ink mist to spread. Accordingly, the controller 8 determines the opening percentage and the opening time for the blow port 63*a* based on the ink mist generation amount such that the ink mist can be collected with the spreading of the ink mist suppressed.

Then, in step S3, the controller 8 cause the printer 3 to perform printing on the print medium 9 conveyed by the conveyor 2, and causes the mist collector 7 to perform the mist collection operation.

Specifically, the controller 8 starts ejection of the inks based on the print data in each inkjet head 26, based on the number of pulses outputted by the encoder 15 from detection of a leading edge of the print medium 9 by the medium sensor 4. The controller 8 then controls each inkjet head 26 such that the inkjet head 26 performs ink ejection based on the print data at a timing based on the output pulse signal of the encoder 15.

In the printing operation, in each ink circulator 31 of each ink tower 5, the ink is supplied from the positive pressure tank 41 to the inkjet heads 26, and the ink not consumed in the inkjet heads 26 is collected into the negative pressure tank 43. When the inkjet printer 1 falls into a state where the positive pressure tank liquid level sensor 42 is off and the negative pressure tank liquid level sensor 44 is on, the controller 8 drives the ink pump 48. The ink is thereby fed from the negative pressure tank 43 to the positive pressure tank 41. When the positive pressure tank liquid level sensor 42 turns on, the controller 8 stops the ink pump 48. Moreover, when the inkjet printer 1 falls into a state where the positive pressure tank liquid level sensor 42 and the negative pressure tank liquid level sensor 44 are both off, the controller 8 performs control such that the ink supplier 6 supplies the ink to the negative pressure tank 43. The printing is performed with the ink being circulated as described above.

Moreover, the controller 8 controls the mist collector 7 for each inkjet head 26 that performs ink ejection such that the mist collector 7 performs the mist collection operation in the period in which the inkjet head 26 is ejecting no inks while facing the print medium 9. In this case, the controller 8 can determine the period in which the inkjet head 26 that performs ink ejection is ejecting no inks while facing the print medium 9, based on the print data and the number of pulses outputted by the encoder 15 from the detection of the leading edge of the print medium 9 by the medium sensor 4.

As the mist collection operation, for each inkjet head 26 that performs ink ejection, the controller 8 drives the blow port shutter 65 and the suction port shutter 66 such that the blow port shutter 65 and the suction port shutter 66 open and close the blow port 63*a* and the suction port 64*a* corresponding to the inkjet head 26, based on the opening percentage and the opening time determined in step S2.

In the printing operation, for each inkjet head 26, when at least one of the temperatures of the inks of two colors detected by the ink temperature sensors 27A and 27B changes, the controller 8 may adjust at least one of the opening percentage and the opening time of at least one of the blow port 63*a* and the suction port 64*a*, depending on the change in the temperature of the ink.

At the start of printing, all blow ports 63*a* and suction ports 64*a* are closed. Drive of the blow fan 61 and the suction fan 62 is started before a time point at which one of the blow ports 63*a* and the suction ports 64*a* is opened for the first time after the start of printing.

When the blow port 63*a* and the suction port 64*a* are opened, as illustrated in FIGS. 7 and 8, an air flow Fc from the blow port 63*a* toward the suction port 64*a* is generated by an air flow Fa of air blown out from the blow port 63*a*, an air flow Fb of air sucked by the suction port 64*a*, and a conveyance air flow. In this case, a space 71 between the inkjet head 26 and the print medium 9 is formed as a flow passage of air for collecting the ink mist, and the air flow Fc flows through this flow passage. Air containing the ink mist near the nozzle surface 26*a* of the inkjet head 26 is thus sucked into the suction port 64*a*, and the ink mist is thereby collected.

When the printing based on the print data and the mist collection operation are completed, the series of operations is completed.

As described above, the mist collection operation is performed for each inkjet head 26 that performs ink ejection, in the period in which the inkjet head 26 is ejecting no inks while facing the print medium 9.

Figure 10:
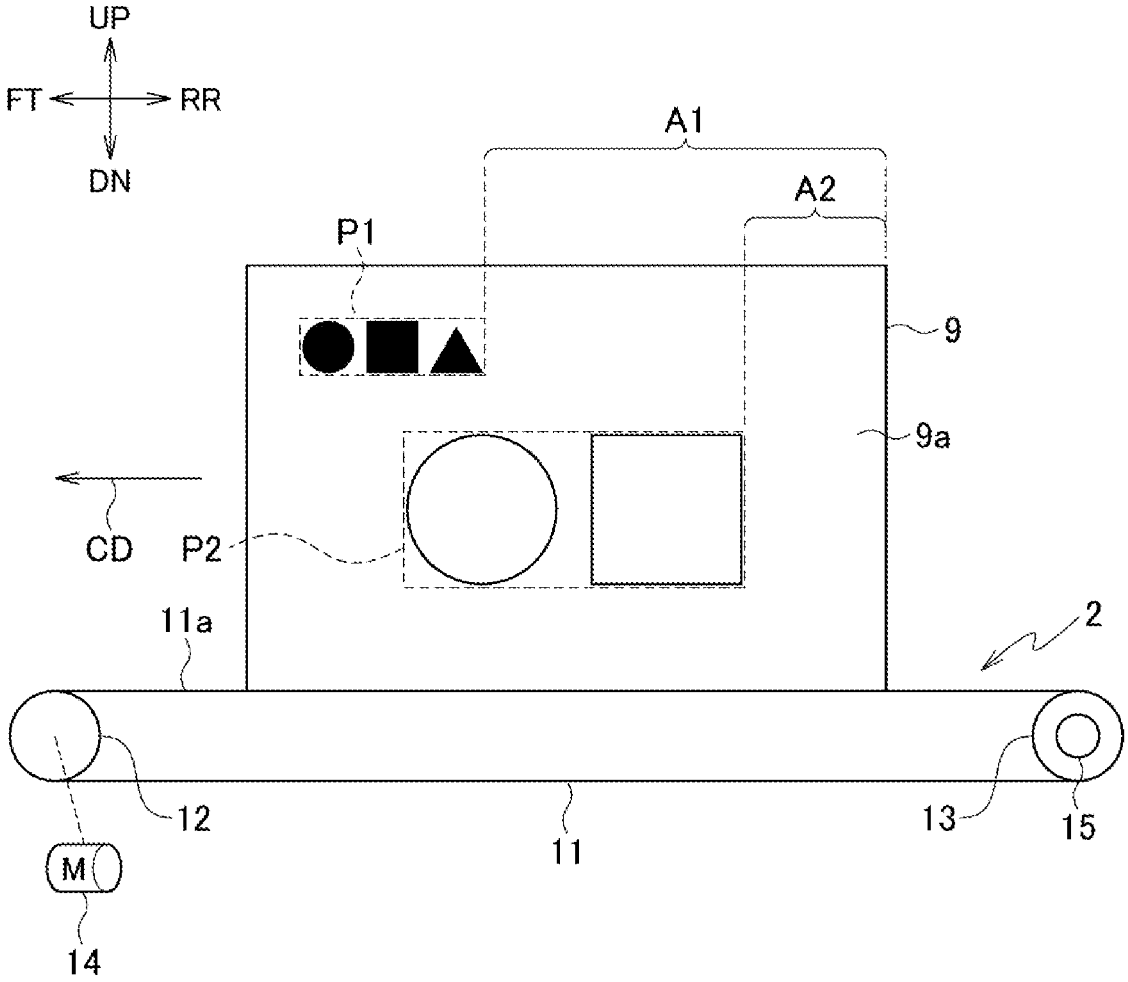
FIG. 10 is a diagram for explaining a period in which a mist collection operation is performed.

For example, in the case of print data to be printed in print regions P1 and P2 as illustrated in FIG. 10, the mist collection operation for each of the inkjet heads 26 that perform printing in the print regions P1 and P2 is performed in a period in which the inkjet head 26 is facing a corresponding one of regions A1 and A2 in the conveyance direction. In this case, each of the regions A1 and A2 is a region between a trailing end (upstream end) of a corresponding one of the print regions P1 and P2 and a trailing end (upstream end) of the print medium 9. Moreover, the inkjet heads 26 that perform printing in the print region P1 are all assumed to perform ink ejection to the trailing end of the print region P1. The same applies to the inkjet heads that perform printing on the print regions P2.

As described above, the opening percentage and the opening time of each of the blow port 63*a* and the suction port 64*a* corresponding to each inkjet head 26 that performs ink ejection are determined based on the ink mist generation amount of the inkjet head 26. In this case, the opening percentage and the opening time of each of the blow port 63*a* and the suction port 64*a* are determined such that the mist collection operation is completed before the trailing edge of the print medium 9 arrives at the inkjet head 26. However, the opening time may be determined such that the blow port 63*a* and the suction port 64*a* are opened beyond a period from the time point of completion of the ink ejection in the inkjet head 26 to the arrival of the trailing edge of the print medium 9 at the inkjet head 26, in the case where this period is short or in similar cases.

Moreover, in the case where there is almost no period from the time point of completion of the ink ejection in the inkjet head 26 to the arrival of the trailing edge of the print medium 9 at the inkjet head 26, the mist collection operation of opening the blow port 63*a* and the suction port 64*a* may be performed after the trailing edge of the print medium 9 passes the inkjet head 26. In this case, the space 71 between the inkjet head 26 and the print medium 9 cannot be formed as the flow passage of air for collecting the ink mist. Accordingly, efficiency of ink mist collection is low. However, it is possible to partially collect the ink mist and reduce floating ink mist.

As described above, in the inkjet printer 1, the controller 8 controls the mist collector 7 for each inkjet head 26 such that the mist collector 7 performs the mist collection operation in the period in which the inkjet head 26 is ejecting no inks while facing the print medium 9.

Performing the mist collection operation in the situation where the inkjet head 26 is facing the print medium 9 as described above allows the space 71 between the inkjet head 26 and the print medium 9 to be used as the flow passage of air for collecting the ink mist. The ink mist can be thereby efficiently collected. Moreover, performing the mist collection operation in the period in which no inks are ejected can suppress a decrease in print quality incurred by ink landing position misalignment caused by the air flow generated by the mist collection operation.

Accordingly, it is possible to efficiently collect the ink mist while suppressing the decrease in image quality in the inkjet printer 1 in which the nozzle surface 26*a* side (side on which the print medium 9 passes) of the inkjet heads 26 is an open space.

Moreover, in the inkjet printer 1, the mist collector 7 includes the multiple sets of the blow port 63*a* and the suction port 64*a* provided to correspond to the respective inkjet heads 26. The controller 8 controls the mist collector 7 based on the ink mist generation amount in each inkjet head 26 such that the degree of mist collection in the mist collection operation is adjusted for the inkjet head 26. Specifically, for each inkjet head 26, the controller 8 adjusts the opening percentage and the opening time of each of the blow port 63*a* and the suction port 64*a* corresponding to the inkjet head 26, based on the ink mist generation amount. This can suppress the case where the degree of mist collection for each inkjet head 26 becomes excessive, and enables execution of efficient ink mist collection.

Moreover, the controller 8 calculates the ink mist generation amount in each inkjet head 26 by using the water head difference between the inkjet head 26 and each of the positive pressure tank 41 and the negative pressure tank 43 connected to the inkjet head 26. The degree of mist collection can be thereby adjusted while taking an effect of the water head difference between the inkjet head 26 and each of the positive pressure tank 41 and the negative pressure tank 43 on the degree of ink mist generation into consideration.

Second Embodiment

Next, a second embodiment partially changed from the aforementioned first embodiment is described.

In the second embodiment, the controller 8 adjusts the aforementioned degree of mist collection determined based on the ink mist generation amount, based on a head gap and conveyance speed of the print medium 9, for each blow port 63*a*.

The head gap is a distance between the print medium 9 and the inkjet head 26 in the situation where the print medium 9 and the inkjet head 26 are facing each other. The head gap is set depending on the type of the print medium 9 and the like. Moreover, the conveyance speed of the print medium 9 is set depending on a print resolution and the like.

In this case, the lower the conveyance speed of the print medium 9 is, or the larger the head gap is, the weaker the conveyance air flow is, the conveyance air flow flowing from the blow port 63*a* side toward the suction port 64*a* side near the inkjet heads 26 due to an effect of the conveyance of the print medium 9. In other words, the lower the conveyance speed of the print medium 9 is, or the larger the head gap is, the less likely the mist collection operation of the mist collector 7 is to be assisted by the conveyance air flow.

Accordingly, in the second embodiment, as described above, the controller 8 adjusts the degree of mist collection determined based on the ink mist generation amount, based on the head gap and the conveyance speed of the print medium 9, for the blow port 63*a*.

Specifically, the controller 8 adjusts the opening percentage and the opening time of the blow port 63*a* such that the lower the conveyance speed of the print medium 9 is, the greater the degree of mist collection is, if the head gap is the same. Moreover, the controller 8 adjusts the opening percentage and the opening time of the blow port 63*a* such that the larger the head gap is, the greater the degree of mist collection is, if the conveyance speed of the print medium 9 is the same. The blow port 63*a* may be adjusted not to open (the opening percentage and the opening time are set to zero).

According to the second embodiment as described above, it is possible to adjust the degree of mist collection by the mist collector 7 more suitably and efficiently collect the ink mist.

Third Embodiment

Next, a third embodiment partially changed from the aforementioned first embodiment is described.

Figure 11:
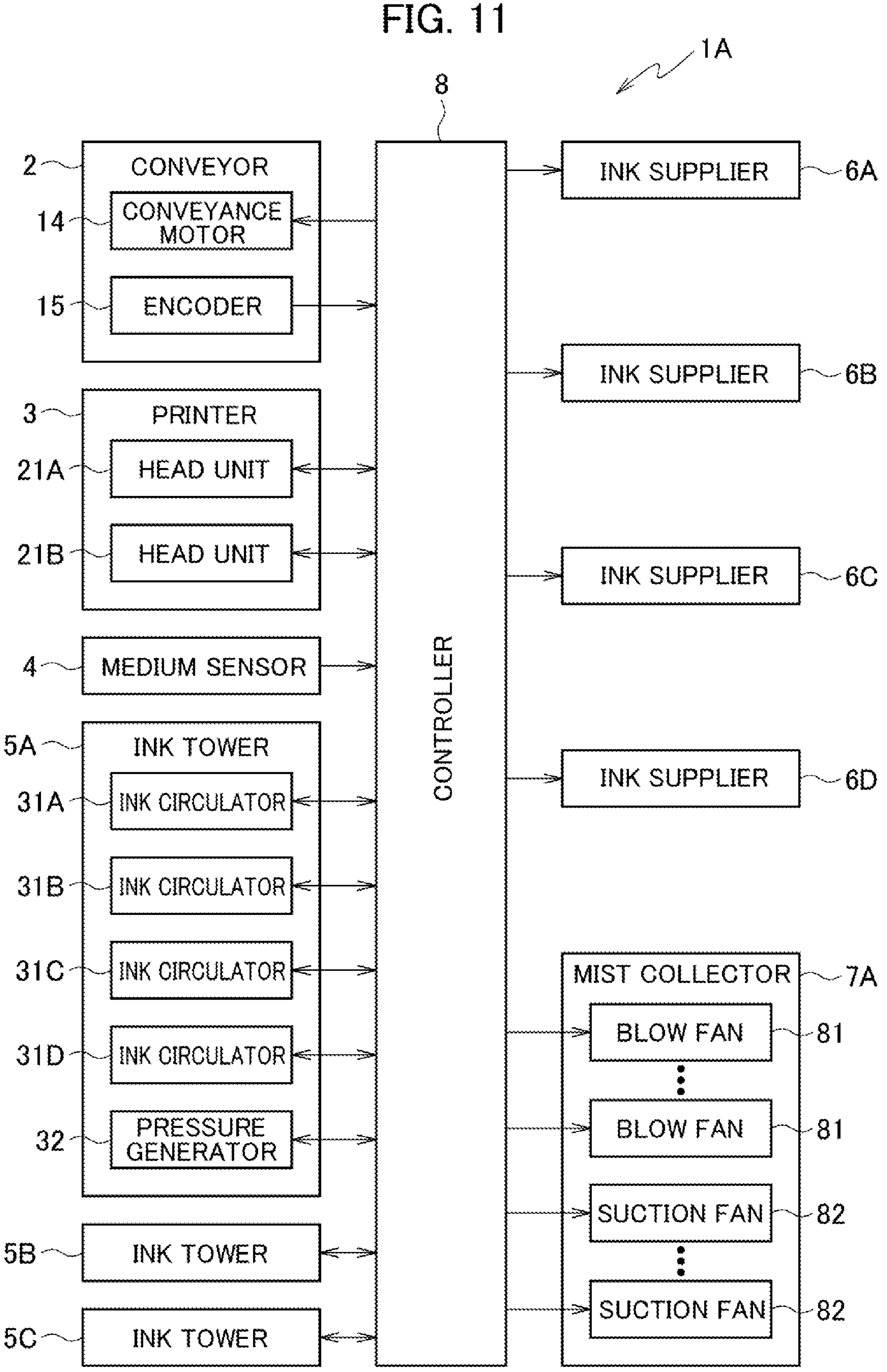
FIG. 11 is a block diagram illustrating a configuration of an inkjet printer according to a third embodiment.
Figure 12:
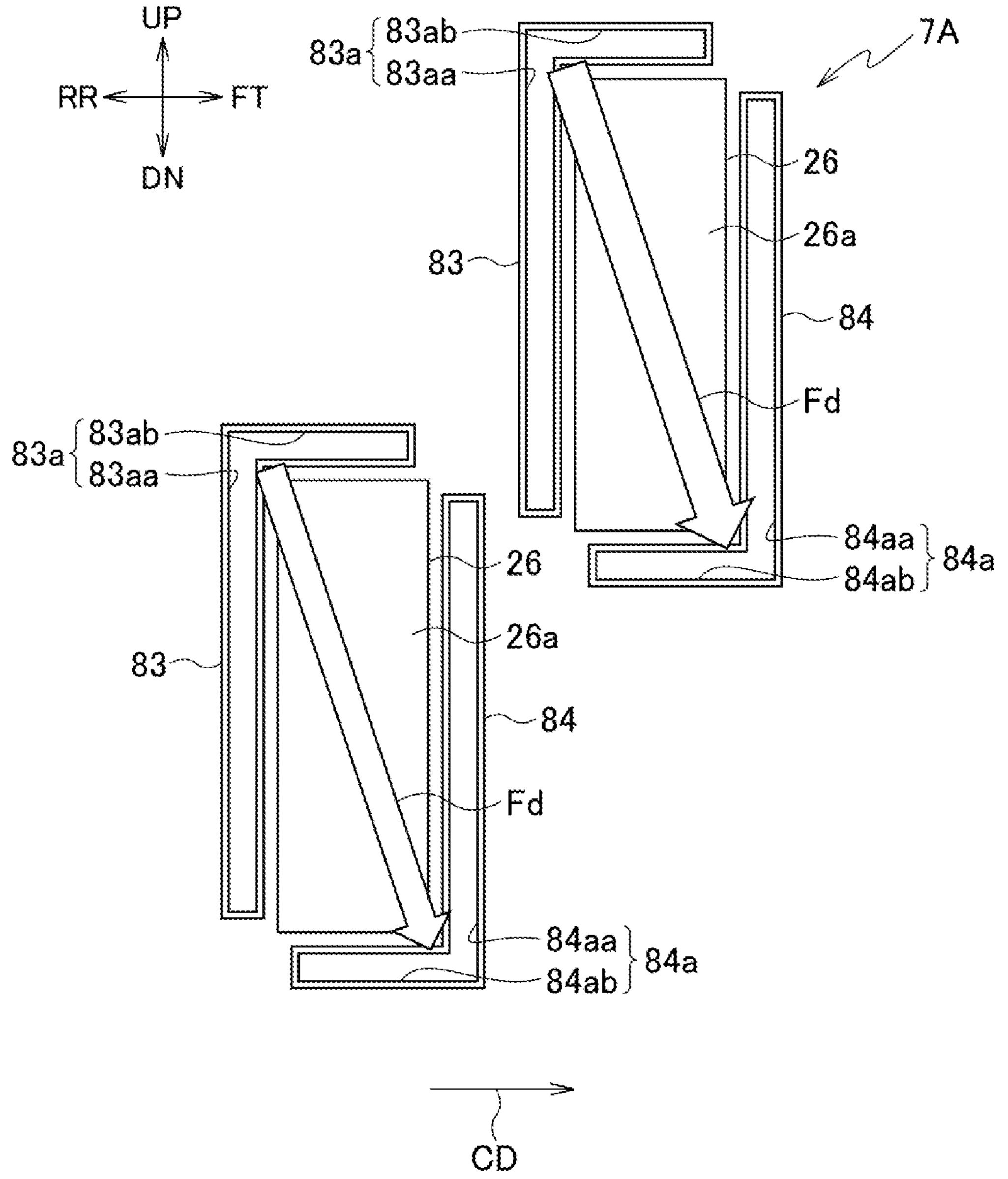
FIG. 12 is a diagram illustrating a main portion of a mist collector as viewed from the nozzle surface side of the inkjet head in the inkjet printer illustrated in FIG. 11.

FIG. 11 is a block diagram illustrating a configuration of an inkjet printer according to the third embodiment. FIG. 12 is a diagram illustrating a main portion of a mist collector as viewed from the nozzle surface side of the inkjet head in the inkjet printer illustrated in FIG. 11.

As illustrated in FIG. 11, the inkjet printer 1A according to the third embodiment has a configuration in which the mist collector 7 in the inkjet printer 1 of the first embodiment described above is replaced by a mist collector 7A.

As illustrated in FIGS. 11 and 12, the mist collector 7A includes multiple blow fans 81, multiple suction fans 82, multiple blow channels 83, multiple suction channels 84, and multiple filters (not illustrated). The blow fan 81, the suction fan 82, the blow channel 83, the suction channel 84, and the filter are provided for each of the inkjet heads 26, and each of these elements is provided as many as the inkjet heads 26. Note that FIG. 12 illustrates two inkjet heads 26 connected to the same ink tower 5, and sets of the blow channel 83 and the suction channel 84 corresponding to the respective inkjet heads 26.

The blow fans 81 blow air to the blow channels 83 to blow out air from blow ports 83*a* to be described later. One blow fan 81 is provided for one blow channel 83.

The suction fans 82 sucks air via suction ports 84*a* of the suction channels 84 to be described later. One suction fan 82 is provided for one suction channel 84.

Each blow channel 83 forms a flow passage of air blown out toward the side on which the print medium 9 passes (left side) for ink mist collection. The blow channel 83 includes a portion arranged along an upstream (rear) side surface of the inkjet head 26 and a portion arranged along an upper side surface of the inkjet head 26. The blow fan 81 is connected to one end of the blow channel 83. The other end of the blow channel 83 is opened toward the side on which the print medium 9 passes (left side) to be the blow port 83*a* that blows out air.

The blow port 83*a* includes an upstream portion 83*aa* that blows out air at a position upstream of (behind) the inkjet head 26, and an upper portion 83*ab* that blows out air at a position above the inkjet head 26.

Each suction channel 84 forms a flow passage of air sucked from the side on which the print medium 9 passes (left side) for ink mist collection. The filter that liquifies and holds the ink mist is arranged in the suction channel 84. The suction channel 84 includes a portion arranged along a downstream (front) side surface of the inkjet head 26 and a portion arranged along a lower side surface of the inkjet head 26. The suction fan 82 is connected to one end of the suction channel 84. The other end of the suction channel 84 is opened toward the side on which the print medium 9 passes (left side) to be the suction port 84*a* that sucks air.

The suction port 84*a* includes a downstream portion 84*aa* that sucks air at a position downstream of (in front of) the inkjet head 26 and a lower portion 84*ab* that sucks air at a position below the inkjet head 26.

In the third embodiment, the controller 8 adjusts an air volume (duty ratio of drive signal) and a drive time of each of the blow fan 81 and the suction fan 82 to adjust the degree of mist collection in the mist collection operation. Specifically, for each inkjet head 26, the controller 8 determines the air volume and the drive time of each of the blow fan 81 and the suction fan 82 corresponding to the inkjet head 26, based on the ink mist generation amount of the inkjet head 26. The larger the air volume is, the greater the degree of mist collections is, if the drive time is the same. Moreover, the longer the drive time is, the greater the degree of mist collections is, if the air volume is the same.

As described in the first embodiment, the ink mist may spread due to air blown out from the blow port 83*a* in the mist collection operation. Accordingly, the controller 8 determines the air volume and the drive time of the blow fan 81 based on the ink mist generation amount such that the ink mist can be collected with the spreading of the ink mist suppressed.

In the printing operation in the inkjet printer 1A, as the mist collection operation, for each inkjet head 26 that performs ink ejection, the controller 8 drives each of the blow fan 81 and the suction fan 82 corresponding to the inkjet head 26 at the air volume (duty ratio of drive signal) and the drive time determined based on the ink mist generation amount.

When the blow fan 81 and the suction fan 82 are driven, as illustrated in FIG. 12, an air flow Fd flowing from the rear upper side to the front lower side of the inkjet heads 26 is generated in the air space 71 between the inkjet head 26 and the print medium 9 by an air flow of air blown out from the upstream portion 83*aa* and the upper portion 83*ab* of the blow port 83*a*, an air flow of air sucked by the downstream portion 84*aa* and the lower portion 84*ab* of the suction port 84*a*, and the conveyance air flow.

Air containing the ink mist near the nozzle surface 26*a* of the inkjet head 26 is thereby sucked into the suction port 84*a*, and the ink mist is thus collected. In this case, the air flow Fd as described above enables efficient collection of the ink mist that falls in the vertically-downward direction by being affected by gravity.

As described above, in the third embodiment, the blow port 83*a* includes the upstream portion 83*aa* and the upper portion 83*ab*, and the suction port 84*a* includes the downstream portion 84*aa* and the lower portion 84*ab*. The ink mist that falls in the vertically-downward direction by being affected by gravity can be thereby efficiently collected. Accordingly, an efficiency of ink mist collection can be improved.

In the third embodiment, as in the second embodiment described above, the degree of mist collection determined based on the ink mist generation amount may be adjusted for each blow port 83*a* (blow fan 81) based on the head gap and the conveyance speed of the print medium 9. This allows the degree of mist collection by the mist collector 7A to be more suitably adjusted, and enables execution of efficient ink mist collection.

Other Embodiments

As described above, the present invention is described by using the first to third embodiments. However, the statement and the drawings forming part of the present disclosure should not be understood to limit the present invention. Various alternative embodiments, examples, and operation techniques are apparent to those skilled in the art from the present disclosure.

In the first to third embodiments described above, the mist collection operation is performed for each inkjet head 26 in the period in which the inkjet head 26 is ejecting no inks. However, the mist collection operation may be performed for each inkjet head 26 in a situation where the inkjet head 26 is facing the print medium 9 regardless of whether the inkjet head 26 is in a period in which it is ejecting the inks or not.

Also in this case, the ink mist can be efficiently collected by using the space 71 between the inkjet head 26 and the print medium 9 as the flow passage of air for collecting of the ink mist. Note that, in this case, the degree of mist collection in the mist collection operation may be adjusted such that the ink landing position misalignment is suppressed.

Moreover, in the first to third embodiments described above, description is given of the inkjet printers 1 and 1A in which the nozzle surface 26*a* of each inkjet heads 26 is a vertical surface and the inkjet head 26 ejects the inks in the horizontal direction. However, the orientation of the inkjet head 26 (nozzle surface 26*a*) is not limited to this.

In the first and second embodiments, the configuration only needs to be such that the space on the nozzle surface side (side on which the print medium passes) of the inkjet head is an open space in which nothing but the passing print medium is arranged within the prescribed distance from the inkjet head, regardless of the angle of the nozzle surface. For example, in the first and second embodiments, also in an inkjet printer in which each inkjet head is installed to eject the inks downward in the vertical direction with the nozzle surface being a horizontal surface to perform printing on an upper surface of a print medium that is a three-dimensional object, it is only necessary that the distance between the nozzle surface and a conveyance mechanism of the print medium is larger than the prescribed distance and a space below the inkjet head (on the side on which the print medium passes) is an open space. A conveyance surface on which the print medium is conveyed may be in parallel with the nozzle surface or not as long as the space on the nozzle surface side of the inkjet head is an open space.

In the third embodiment, the configuration only needs to be such that each nozzle surface is a non-horizontal surface and the space on the nozzle surface side (side on which the print medium passes) of each inkjet head is an open space in which nothing but the passing print medium is arranged within the prescribed distance from the inkjet head. Also in the third embodiment, as in the first and second embodiments, a conveyance surface on which the print medium is conveyed may be in parallel with the nozzle surface or not as long as the space on the nozzle surface side of the inkjet head is an open space.

Moreover, in the first and second embodiments described above, the opening percentage and the opening time of each of the blow port 63*a* and the suction port 64*a* are adjusted to adjust the degree of mist collection in the mist collection operation. However, only one of the opening percentage and the opening time may be adjusted.

Furthermore, in the first and second embodiments described above, description is given of the configuration in which the blow fan 61 is a common blow fan shared by the multiple blow ports 63*a*, the suction fan 62 is a common suction fan shared by the multiple suction ports 64*a*, the blow port shutters 65 are provided in the respective blow ports 63*a*, and the suction port shutters 66 are provided in the respective suction ports 64*a*. However, the configuration may be such that one blow fan is provided for each blow port 63*a* and one suction fan is provided for each suction port 64*a*. In this case, individually controlling each of the blow fans and each of the suction fans enables adjustment of the degree of mist collection in the mist collection operation for each inkjet head 26. For example, for each inkjet head 26, at least one of an air volume (duty ratio of the drive signal) and a drive time of each of the blow fan and the suction fan corresponding to the inkjet head 26 may be adjusted based on the ink mist generation amount.

Moreover, in the third embodiment described above, the air volume (duty ratio of the drive signal) and the drive time of each of the blow fan 81 and the suction fan 82 are adjusted to adjust the degree of mist collection in the mist collection operation. However, only one of the air volume and the drive time may be adjusted.

Furthermore, in the third embodiment, the configuration may be such that shutters that open and close the blow ports 83*a* and the suction ports 84*a* are provided, respectively, and at least one of an opening percentage and an opening time of each shutter is adjusted to adjust the degree of mist collection in the mist collection operation. Moreover, in this case, the blow fan may be a common blow fan shared by the blow ports 83*a*, and the suction fan may be a common suction fan shared by the suction ports 84*a*.

Moreover, in the first and second embodiments described above, the configuration may be such that air is blown out from the blow ports 63*a* by using positive pressure generated by a pressure generation mechanism and air is sucked from the suction ports 64*a* by using negative pressure generated by the pressure generation mechanism. Similarly, also in the third embodiment, the configuration may be such that air is blown out from the blow ports 83*a* by using positive pressure generated by a pressure generation mechanism, and air is sucked from the suction ports 84*a* by using negative pressure generated by the pressure generation mechanism.

Furthermore, in the third embodiment described above, description is given of the configuration in which the upstream portion 83*aa* and the upper portion 83*ab* of the blow port 83*a* are connected to each other, and the downstream portion 84*aa* and the lower portion 84*ab* of the suction port 84*a* are connected to each other. However, the configuration may be such that the upstream portion 83*aa* and the upper portion 83*ab* of the blow port 83*a* are separated from each other. Moreover, the configuration may be such that the downstream portion 84*aa* and the lower portion 84*ab* of the suction port 84*a* are separated from each other.

Moreover, in the first and second embodiments, the blow fan 61, the blow channels 63 (blow ports 63*a*), and the blow port shutters 65 may be omitted. Also in this case, the suction of air by the suction ports 64*a* and the conveyance air flow generate the air flow toward the suction ports 64*a* in the space 71 between the inkjet heads 26 and the print medium 9, and the ink mist can be efficiently collected. Similarly, in the third embodiment, the blow fans 81 and the blow channels 83 (blow ports 83*a*) may be omitted.

Furthermore, in the first and second embodiments, the configuration may be such that the blow fan 61, the blow channels 63 (blow ports 63*a*), and the blow port shutters 65 are omitted, and the suction channels 64 (suction ports 64*a*) are arranged upstream of the inkjet heads 26.

Moreover, in the second and third embodiments described above, for each of the blow ports 63*a* and 83*a*, the degree of mist collection determined based on the ink mist generation amount is adjusted based on the head gap and the conveyance speed of the print medium 9. However, for each of the blow ports 63*a* and 83*a*, the degree of mist collection may be adjusted based on the head gap and the conveyance speed of the print medium 9, regardless of the ink mist generation amount.

Furthermore, in the third embodiment described above, description is given of the configuration in which two of the six inkjet heads 26 in each head unit 21 is connected to the common positive pressure tank 41 and the common negative pressure tank 43. However, the configuration is not limited to this, and may be such that, for example, all inkjet heads 26 in the head unit 21 are connected to a common positive pressure tank and a common negative pressure tank.

Moreover, in the first to third embodiments described above, the ink circulation type inkjet printers 1 and 1A are described. However, the present invention is not limited to this, and can be applied to inkjet printers of other types.

Furthermore, in the first and second embodiments described above, description is given of the configuration in which the inkjet printer 1 includes the multiple inkjet heads 26, and the mist collector 7 includes the multiple sets of the blow port 63*a* and the suction port 64*a* provided to correspond to the respective inkjet heads 26. However, the configuration may be such that one blow port and one suction port are provided for the multiple inkjet heads 26.

For example, the configuration may be such that, for one head unit 21, one blow port is arranged upstream of the head unit 21 and one suction port is arranged downstream of the head unit 21. Moreover, the configuration may be such that, for four head units 21, one blow port is arranged upstream of the most-upstream head unit 21 and one suction port is arranged downstream of the most-downstream head unit 21.

Moreover, in the first and second embodiments described above, description is given of the configuration in which air is blown from the blow port 63*a* opened upstream of each inkjet head 26, and air is sucked from the suction port 64*a* opened downstream of the inkjet head 26. However, the configuration is not limited to this, and the locations of the blow port 63*a* and the suction port 64*a* may be reversed. For example, control may be performed such that the conveyance speed of the print medium 9 by the conveyor 2 is reduced when the trailing end (upstream end) of the print medium 9 passes the inkjet head 26, and air is blown from the suction port 64*a* and is sucked from the blow port 63*a* in the state where the suction port 64*a* is facing the print medium 9. This can suppress spreading of the ink mist to the outside of the space 71 that occurs in the case where air is blown from the blow port 63*a* when the trailing end of the print medium 9 passes the inkjet head 26.

The embodiments of the disclosure have, for example, the following configurations.

(Appendix 1)

An inkjet printer includes: an inkjet head configured to eject ink to a print medium being conveyed; a mist collector including at least a suction port configured to suck air from a side of the inkjet head on which the print medium passes; and a controller configured to control the mist collector. A space on the side of the inkjet head on which the print medium passes is an open space in which nothing but the print medium passing is arranged within a prescribed distance from the inkjet head. The controller is configured to control the mist collector to perform a mist collection operation of sucking air containing ink mist via the suction port in a state where the print medium and the inkjet head are facing each other.

(Appendix 2)

In the inkjet printer according to Appendix 1, the mist collector may further include a blow port configured to blow out air toward the side of the inkjet head on which the print medium passes, and in the mist collection operation, the controller may be configured to control the mist collector to suck the air containing the ink mist via the suction port while blowing out air from the blow port.

(Appendix 3)

In the inkjet printer according to Appendix 1, the suction port may be arranged downstream of the inkjet head in a conveyance direction of the print medium.

(Appendix 4)

In the inkjet printer according to Appendix 2, the inkjet head may include a plurality of inkjet heads, the suction port may include a plurality of suction ports provided to the plurality of inkjet heads, respectively, the blow port may include a plurality of blow ports provided to the plurality of inkjet heads, respectively, and the controller may be configured to control the mist collector to adjust a degree of mist collection in the mist collection operation for each of the plurality of inkjet heads, based on an ink mist generation amount in each of the plurality of inkjet heads.

(Appendix 5)

In the inkjet printer according to Appendix 3, the inkjet head may include a plurality of inkjet heads, the suction port may include a plurality of suction ports provided to the plurality of inkjet heads, respectively, and the controller may be configured to control the mist collector to adjust a degree of mist collection in the mist collection operation for each of the plurality of inkjet heads, based on an ink mist generation amount in each of the plurality of inkjet heads.

(Appendix 6)

In the inkjet printer according to Appendix 1, the controller may be configured to control the mist collector to perform the mist collection operation in a period in which the inkjet head is not ejecting the ink in the state where the print medium and the inkjet head are facing each other.

(Appendix 7)

In the inkjet printer according to Appendix 3, the inkjet head may be arranged such that an ejection surface from which the ink is ejected is a non-horizontal surface, and the suction port may include a first portion configured to suck air at a position downstream of the inkjet head in the conveyance direction and a second portion configured to suck air at a position below the inkjet head.

(Appendix 8)

In the inkjet printer according to Appendix 3, the mist collector may further include a blow port configured to blow out air toward the side of the inkjet head on which the print medium passes at a position upstream of the inkjet head in the conveyance direction.

(Appendix 9)

In the inkjet printer according to Appendix 8, the inkjet head may include a plurality of inkjet heads, the suction port may include a plurality of suction ports provided to the plurality of inkjet heads, respectively, the blow port may include a plurality of blow ports provided to the plurality of inkjet heads, respectively, and the controller may be configured to control the mist collector to adjust a degree of mist collection in the mist collection operation for each of the plurality of inkjet heads, based on an ink mist generation amount in each of the plurality of inkjet heads.

(Appendix 10)

In the inkjet printer according to Appendix 8, the controller may be configured to control the mist collector to adjust a degree of mist collection of the blow port in the mist collection operation based on at least one of a conveyance speed of the print medium and a distance between the print medium and the inkjet head in the state where the print medium and the inkjet head are facing each other.

(Appendix 11)

In the inkjet printer according to Appendix 8, the inkjet head may be arranged such that an ejection surface from which the ink is ejected is a non-horizontal surface, the suction port may include a first portion configured to suck air at a position downstream of the inkjet head in the conveyance direction and a second portion configured to suck air at a position below the inkjet head, and the blow port may include a third portion configured to blow out air at a position upstream of the inkjet head in the conveyance direction and a fourth portion configured to blow out air at a position above the inkjet head.

(Appendix 12)

In the inkjet printer according to Appendix 4, at least some of the plurality of inkjet heads may be connected to a common ink tank, and be arranged such that a water head difference between each of the some of the plurality of inkjet heads and the common ink tank varies between the some of the plurality of inkjet heads, and the controller may be configured to use the water head difference between each of the some of the plurality of inkjet heads and the common ink tank for calculation of the ink mist generation amount in each of the some of the plurality of inkjet heads connected to the common ink tank.

(Appendix 13)

The inkjet printer according to Appendix 1 may further include a conveyor including a conveyance surface on which the print medium is placed and that does not face an ejection surface of the inkjet head from which the ink is ejected.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer comprising:

an inkjet head configured to eject ink to a print medium being conveyed and arranged such that an ejection surface from which the ink is ejected is a non-horizontal surface;

a mist collector including at least a suction port configured to suck air from a side of the inkjet head on which the print medium passes; and a controller configured to control the mist collector, wherein a space on the side of the inkjet head on which the print medium passes is an open space in which nothing but the print medium passing is arranged within a prescribed distance from the inkjet head, the controller is configured to control the mist collector to perform a mist collection operation of sucking air containing ink mist via the suction port in a state where the print medium and the inkjet head are facing each other, the suction port is arranged downstream of the inkjet head in a conveyance direction of the print medium, and the suction port includes a first portion configured to suck air at a position downstream of the inkjet head in the conveyance direction and a second portion configured to suck air at a position below the inkjet head.

2. The inkjet printer according to claim 1, wherein the inkjet head includes a plurality of inkjet heads, the suction port includes a plurality of suction ports provided to the plurality of inkjet heads, respectively, and the controller is configured to control the mist collector to adjust a degree of mist collection in the mist collection operation for each of the plurality of inkjet heads, based on an ink mist generation amount in each of the plurality of inkjet heads.

3. The inkjet printer according to claim 1, wherein the controller is configured to control the mist collector to perform the mist collection operation in a period in which the inkjet head is not ejecting the ink in the state where the print medium and the inkjet head are facing each other.

4. The inkjet printer according to claim 1, further comprising a conveyor including a conveyance surface on which the print medium is placed, wherein the conveyance surface on which the print medium is being placed in the state where the print medium and the inkjet head are facing each other does not face the ejection surface.

5. The inkjet printer according to claim 1, wherein
the mist collector further includes a blow port configured to blow out air toward the side of the inkjet head on which the print medium passes, and
in the mist collection operation, the controller is configured to control the mist collector to suck the air containing the ink mist via the suction port while blowing out air from the blow port.

6. The inkjet printer according to claim 5, wherein
the inkjet head includes a plurality of inkjet heads,
the suction port includes a plurality of suction ports provided to the plurality of inkjet heads, respectively,
the blow port includes a plurality of blow ports provided to the plurality of inkjet heads, respectively, and
the controller is configured to control the mist collector to adjust a degree of mist collection in the mist collection operation for each of the plurality of inkjet heads, based on an ink mist generation amount in each of the plurality of inkjet heads.

7. The inkjet printer according to claim 1, wherein the mist collector further includes a blow port configured to blow out air toward the side of the inkjet head on which the print medium passes at a position upstream of the inkjet head in the conveyance direction.

8. The inkjet printer according to claim 7, wherein
the inkjet head includes a plurality of inkjet heads,
the suction port includes a plurality of suction ports provided to the plurality of inkjet heads, respectively,
the blow port includes a plurality of blow ports provided to the plurality of inkjet heads, respectively, and
the controller is configured to control the mist collector to adjust a degree of mist collection in the mist collection operation for each of the plurality of inkjet heads, based on an ink mist generation amount in each of the plurality of inkjet heads.

9. The inkjet printer according to claim 7, wherein the controller is configured to control the mist collector to adjust a degree of mist collection of the blow port in the mist collection operation based on at least one of a conveyance speed of the print medium and a distance between the print medium and the inkjet head in the state where the print medium and the inkjet head are facing each other.

10. The inkjet printer according to claim 7, wherein
the blow port includes a third portion configured to blow out air at a position upstream of the inkjet head in the conveyance direction and a fourth portion configured to blow out air at a position above the inkjet head.

11. An inkjet printer comprising:
an inkjet head configured to eject ink to a print medium being conveyed and arranged such that an ejection surface from which the ink is ejected is a non-horizontal surface;
a mist collector including at least a suction port configured to suck air from a side of the inkjet head on which the print medium passes; and
a controller configured to control the mist collector, wherein
a space on the side of the inkjet head on which the print medium passes is an open space in which nothing but the print medium passing is arranged within a prescribed distance from the inkjet head,
the controller is configured to control the mist collector to perform a mist collection operation of sucking air containing ink mist via the suction port in a state where the print medium and the inkjet head are facing each other,
the mist collector further includes a blow port configured to blow out air toward the side of the inkjet head on which the print medium passes,
in the mist collection operation, the controller is configured to control the mist collector to suck the air containing the ink mist via the suction port while blowing out air from the blow port,
the inkjet head includes a plurality of inkjet heads,
the suction port includes a plurality of suction ports provided to the plurality of inkjet heads, respectively,
the blow port includes a plurality of blow ports provided to the plurality of inkjet heads, respectively,
the controller is configured to control the mist collector to adjust a degree of mist collection in the mist collection operation for each of the plurality of inkjet heads, based on an ink mist generation amount in each of the plurality of inkjet heads,
at least some of the plurality of inkjet heads are connected to a common ink tank, and are arranged such that a water head difference between each of the some of the plurality of inkjet heads and the common ink tank varies between the some of the plurality of inkjet heads, and
the controller is configured to use the water head difference between each of the some of the plurality of inkjet heads and the common ink tank for calculation of the ink mist generation amount in each of the some of the plurality of inkjet heads connected to the common ink tank.

12. An inkjet printer comprising:
an inkjet head configured to eject ink to a print medium being conveyed and arranged such that an ejection surface from which the ink is ejected is a non-horizontal surface;
a mist collector including at least a suction port configured to suck air from a side of the inkjet head on which the print medium passes; and
a controller configured to control the mist collector, wherein
a space on the side of the inkjet head on which the print medium passes is an open space in which nothing but the print medium passing is arranged within a prescribed distance from the inkjet head,
the controller is configured to control the mist collector to perform a mist collection operation of sucking air containing ink mist via the suction port in a state where the print medium and the inkjet head are facing each other,
the suction port is arranged downstream of the inkjet head in a conveyance direction of the print medium,
the inkjet head includes a plurality of inkjet heads,
the suction port includes a plurality of suction ports provided to the plurality of inkjet heads, respectively,
the controller is configured to control the mist collector to adjust a degree of mist collection in the mist collection operation for each of the plurality of inkjet heads, based on an ink mist generation amount in each of the plurality of inkjet heads,
at least some of the plurality of inkjet heads are connected to a common ink tank, and are arranged such that a water head difference between each of the some of the plurality of inkjet heads and the common ink tank varies between the some of the plurality of inkjet heads, and
the controller is configured to use the water head difference between each of the some of the plurality of inkjet heads and the common ink tank for calculation of the ink mist generation amount in the each of the some of the plurality of inkjet heads connected to the common ink tank.

* * * * *